United States Patent
Korkishko et al.

(10) Patent No.: US 9,407,642 B2
(45) Date of Patent: Aug. 2, 2016

(54) APPLICATION ACCESS CONTROL METHOD AND ELECTRONIC APPARATUS IMPLEMENTING THE SAME

(71) Applicant: Samsung Electronics Co., Ltd., Suwon-si, Gyeonggi-do (KR)

(72) Inventors: Tymur Korkishko, Suwon-si (KR); Kyunghee Lee, Suwon-si (KR); Sergiy Pometun, Kyiv (UA); Sergey Belousov, Cherkasy (UA); Vasyl Shutovskyi, Kiev (UA); Vitaliy Vasylskyy, Vinnitsa (UA); Andrey Androsov, Mykolaiv (UA); Kateryna Dovgan, Vinnitsa (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/205,842

(22) Filed: Mar. 12, 2014

(65) Prior Publication Data

US 2014/0281501 A1    Sep. 18, 2014

Related U.S. Application Data

(60) Provisional application No. 61/779,220, filed on Mar. 13, 2013.

(30) Foreign Application Priority Data

Feb. 28, 2014  (KR) .......................... 10-2014-0023825

(51) Int. Cl.
*G06F 21/00*  (2013.01)
*H04L 29/06*  (2006.01)

(52) U.S. Cl.
CPC ........... *H04L 63/123* (2013.01); *H04L 63/0428* (2013.01)

(58) Field of Classification Search
CPC .............. H04L 63/0823; H04L 9/3294; H04L 63/0442; H04L 63/123
See application file for complete search history.

(56) References Cited

U.S. PATENT DOCUMENTS

| | | | |
|---|---|---|---|
| 2003/0182560 A1* | 9/2003 | Brizek | 713/189 |
| 2009/0138712 A1* | 5/2009 | Driscoll | 713/170 |
| 2009/0193522 A1 | 7/2009 | Ishikawa et al. | |
| 2012/0109990 A1* | 5/2012 | Yamasaki | 707/758 |
| 2013/0061048 A1* | 3/2013 | Suu et al. | 713/165 |
| 2013/0078949 A1* | 3/2013 | Pecen et al. | 455/411 |
| 2014/0082350 A1* | 3/2014 | Zarfoss et al. | 713/155 |

* cited by examiner

*Primary Examiner* — Carl Colin
*Assistant Examiner* — Ghodrat Jamshidi
(74) *Attorney, Agent, or Firm* — Jefferson IP Law, LLP

(57) ABSTRACT

A method and apparatus of access control in an electronic apparatus implementing the method are provided. The method of operating an electronic apparatus includes detecting an access request to a resource from an application included in a first area of a memory by a processor of the electronic apparatus, in response to the access request, executing an access control module included in a second area of the memory to calculate a hash value of the application by the processor, determining whether a record exists in the memory, the record corresponding to the hash value and identification information of the application, by executing the access control module by the processor, and allowing access to the resource by the processor when the record exists in the memory.

17 Claims, 14 Drawing Sheets

FIG. 9A

ACCESS CONTROL TABLE

$E_K(App1\_ID, App1\_Hash)$ — 910_1
$E_K(App2\_ID, App2\_Hash)$ — 910_2
⋮
$E_K(AppN\_ID, AppN\_Hash)$ — 910_N

FIG. 9B

ACCESS CONTROL TABLE:

$E_K(App1\_Hash, App1\_Asset) + Auth_K(App1\_Info)$ — 920_1
$E_K(App2\_Hash, App2\_Asset) + Auth_K(App2\_Info)$ — 920_2
⋮
$E_K(AppN\_Hash, AppN\_Asset) + Auth_K(AppN\_Info)$ — 920_N

FIG. 9C

ACCESS CONTROL TABLE:

$E_K(App1\_Auth\_Info, App1\_ID, Data_1) + Auth_1\_Tag_K$ — 930_1
$E_K(App2\_Auth\_Info, App2\_ID, Data_2) + Auth_2\_Tag_K$ — 930_2
⋮
$E_K(AppN\_Auth\_Info, AppN\_ID, Data_N) + Auth_N\_Tag_K$ — 930_N

APPLICATION ACCESS CONTROL METHOD AND ELECTRONIC APPARATUS IMPLEMENTING THE SAME

CROSS-REFERENCE TO RELATED APPLICATION(S)

This application claims the benefit under 35 U.S.C. §119 (e) of a U.S. Provisional application filed on Mar. 13, 2013 in the U.S. Patent and Trademark Office and assigned Ser. No. 61/779,220, and under 35 U.S.C. §119(a) of a Korean patent application filed on Feb. 28, 2014 in the Korean Intellectual Property Office and assigned Serial number 10-2014-0023825, the entire disclosure of each of which is hereby incorporated by reference.

TECHNICAL FIELD

The present disclosure relates to a method of controlling access of an application to a computing asset and/or resource and an electronic apparatus implementing the same.

BACKGROUND

An electronic apparatus, such as a smart phone or a tablet Personal Computer (PC), is equipped with a memory, a processor, and an OS (OS) and thus can execute various applications. The electronic apparatus can execute an on-line commercial transaction and a financial transaction. The on-line commercial transaction and the financial transaction commonly pay attention to security in executing functions. For such a security, the electronic apparatus may, for example, control access of an application to a computing asset.

The above information is presented as background information only to assist with an understanding of the present disclosure. No determination has been made, and no assertion is made, as to whether any of the above might be applicable as prior art with regard to the present disclosure.

SUMMARY

Conventional access control methods include a public key infrastructure-based access control method, a password-based access control method, and a local access control method.

It is complicated to install and maintain a system to which the public key infrastructure-based access control method is applied. Further, when a validity period of a certificate expires, a new certificate should be issued. Moreover, the certificate may be lost and/or damaged and it is thus difficult to guarantee the integrity of the certificate. Further, a cost may be required to issue an accredited certificate.

A password-based access control method is considerably vulnerable to hacking and/or loss of a password and has fallen victim to security problems in actual portal and on-line service providing companies.

An electronic apparatus to which the local access control method is applied may not need a password from a user. However, data stored in a local storage of the electronic apparatus may be faked and/or hacked. Therefore, data needing the security needs a safe storage.

The present disclosure may provide a method for controlling access of an application to a computing asset to safely protect the computing asset, and an electronic apparatus implementing the method.

In accordance with an aspect of the present disclosure, a method of access control in an electronic device is provided.

The method includes detecting an access request to a resource from an application included in a first area of a memory by a processor of the electronic apparatus, in response to the access request, executing an access control module included in a second area of the memory to calculate a hash value of the application by the processor, determining whether a record exists in the memory, the record corresponding to the hash value and identification information of the application, by executing the access control module by the processor, and allowing access to the resource by the processor when the record exists in the memory.

In accordance with another aspect of the present disclosure, an electronic apparatus is provided. The apparatus includes a first memory divided into a first area and a second area, a second memory configured to store an access control table including a hash value and identification information of an application and a record for access control of the application to correspond to a resource, and a processor configured to load the access control module into the first area and load the record in at least one of the first area and the second area, wherein, using the access control module loaded into the first area, the processor is configured to perform in response to an access request from the application, calculating a hash value of the application by the processor, determining whether a record exists in the first memory, the record corresponding to the hash value and identification information of the application, and allowing access to the resource when the record corresponding to the hash value and the identification information of the application exists in the memory.

In accordance with another aspect of the present disclosure, a method of operating an electronic apparatus is provided. The method includes configuring a first area and a second area in a volatile memory by a processor of the electronic apparatus including the volatile memory, the second area having a more enhanced security than that of the first area, storing first information extracted from hardware or firmware in the second area by the processor, storing second information in the second area by the processor, detecting an access request to the second information from an software program temporarily stored in the first area by the processor, and authenticating the software program by using at least a part of the software program in the second area by the processor.

In accordance with another aspect of the present disclosure, a method of operating an electronic apparatus is provided. The method includes configuring a first area and a second area in a volatile memory by a processor of an the electronic apparatus including the volatile memory, wherein the second area has having a more enhanced security than that of the first area, temporarily storing first information extracted from hardware or firmware in the second area by the processor, acquiring data representing an software program in the second area by using at least a part of the software program temporarily stored in the first area by the processor, encrypting the data representing the software program in the second area by using the first information, and storing the encrypted data representing the software program in a non-volatile storage device of the electronic apparatus.

In accordance with another aspect of the present invention disclosure, a method of operating an electronic apparatus is provided. The apparatus includes a volatile memory, a non-volatile storage device, a hardware storage device, and a processor, wherein the processor is configured to perform configuring a first area and a second area in the volatile memory, storing first information extracted from the hardware storage device in the second area, storing second information in the second area, detecting an access request to the second information from an software program stored in the first area, and authenticating the software program by using at least a part of the software program in the second area.

An access control method and an electronic apparatus according to an embodiment of the present disclosure can safely protect a computing asset by controlling access of an application to the computing asset.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9A, 9B, and 9C illustrate access control tables according to an embodiment of the present disclosure;

Throughout the drawings, it should be noted that like reference numbers are used to depict the same or similar elements, features, and structures.

DETAILED DESCRIPTION

Figure 1:
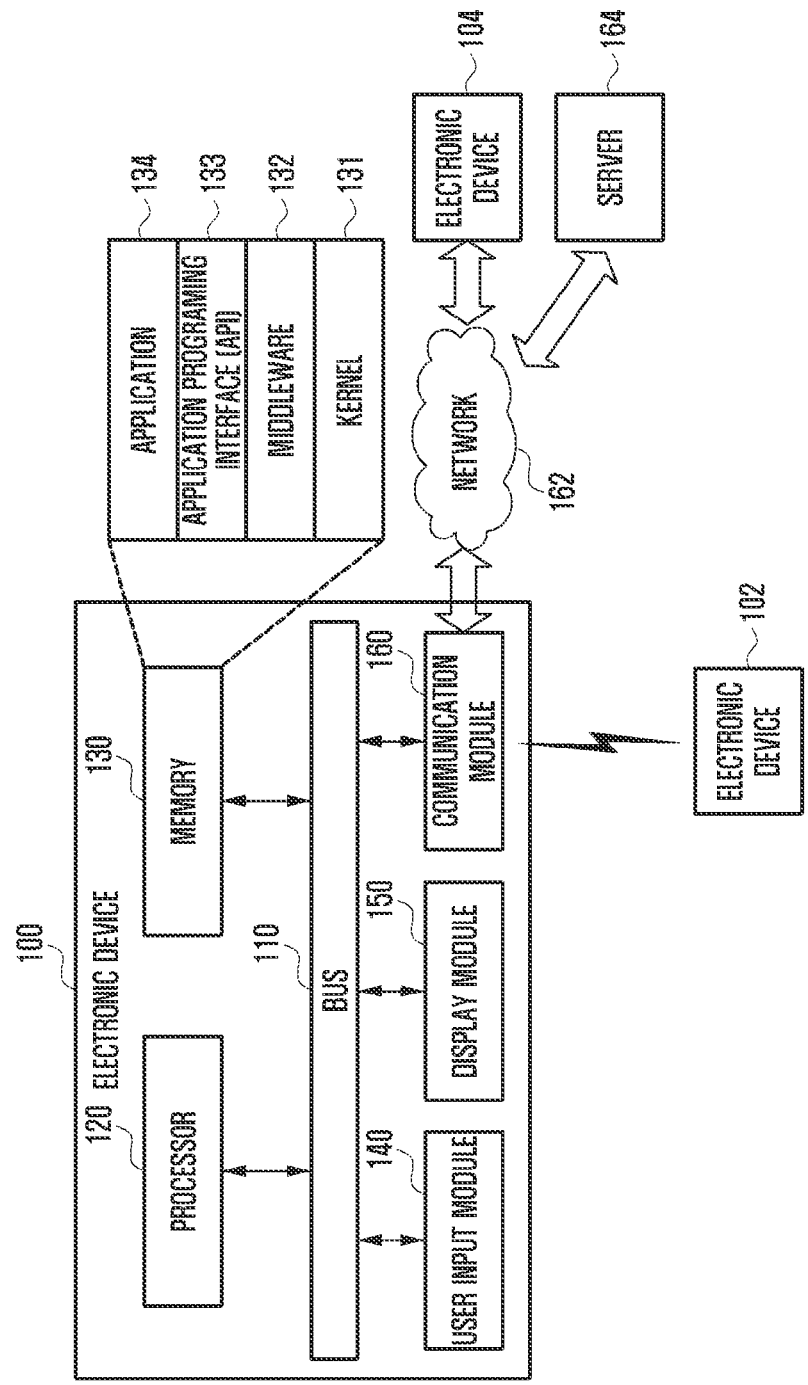
FIG. 1 is a block diagram illustrating an electronic apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic apparatus according to the present disclosure may be an apparatus having a communication function. For example, the electronic device according to the present disclosure may be at least one of and/or combinations of a smart phone, a tablet Personal Computer (PC), a mobile phone, a video phone, an electronic-boot (e-book) reader, a desktop PC, a laptop PC, a netbook computer, a Personal Digital Assistant (PDA), a Portable Multimedia Player (PMP), an MP3 player, a mobile medical appliance, an electronic bracelet, an electronic necklace, an electronic accessory, a camera, a wearable device, an electronic clock, a wrist watch, home appliances, e.g. a refrigerator, an air conditioner, a cleaner, an oven, a microwave oven, a washing machine, an air cleaner, and the like, an artificial intelligence robot, a television, a Digital Video Disk (DVD) player, an audio player, various medical appliances, e.g. a Magnetic Resonance Angiography (MRA) device, a Magnetic Resonance Imaging (MRI) device, a Computerized Tomography (CT) device, an ultra-sonography device and the like, a navigation device, a Global Positioning System (GPS) receiver, an Event Data Recorder (EDR), a Flight Data Recorder (FDR), a set-top box, a Television (TV) box, e.g. HomeSync™ of SAMSUNG Electronics, Co., Apple TV™ of APPLE, Co., and Google TV™ of Google, Co., an electronic dictionary, an infotainment device for a vehicle, an electronic equipment for a ship, e.g. a navigation device, a gyrocompass, etc., an avionic device, a security device, an electronic cloth, an electronic key, a camcorder, a game console, a Head-Mounted Display (HMD) unit, a flat panel display device, an electronic frame, an electronic album, a piece of furniture having a communication function and/or a part of a building/structure, an electronic board, an electronic signature receiving device, and a protector. It is obvious to those skilled in the art that the electronic device according to the present disclosure is not limited to the aforementioned devices.

An electronic apparatus according to the present disclosure may have various environments which can be classified according to functions and operations executed or computed in the environments, respectively. For example, the electronic apparatus may include a trusted environment and a non-trusted environment. The trusted environment may be also referred to as a trusted world, a trusted region, and/or a trusted area. The non-trusted environment may be also referred to as a non-trusted world, a non-trusted region, and/or a non-trusted area.

The non-trusted environment may include a typical Operating System (OS), drivers, middleware, and applications.

Such a system may include Android as an example. Android may include a Linux kernel, device drivers, Android middleware and applications.

The trusted environment may include security critical components. The security critical components may be accessed by an element, e.g. an application, of a non-trusted environment on and/or at run time. By this access, specific security related operations may be executed. In general, the trusted environment may include a security OS, security drivers, security middleware, and Trusted Applications (TAs). Further, the trusted environment may include a special module. Such a special module, e.g. a monitor, can relay and/or control communication between a trusted environment and a non-trusted environment. A non-trusted environment may be configured so as to not be allowed to directly access a trusted environment and is allowed to access the trusted environment only through a monitor. To this end, for example, a TrustZone technology of an Advanced RISC Machines (ARM) company may be applied to the monitor.

FIG. 1 is a block diagram illustrating an electronic apparatus according to an embodiment of the present disclosure.

Referring to FIG. 1, the electronic apparatus 100 may include a bus 110, a processor 120, a memory 130, a user input module 140, a display module 150, and a communication module 160.

The bus 110 may be a circuit for interconnecting elements described above and for allowing a communication, e.g. by transferring a control message, between the elements described above.

The processor 120 can receive commands from the above-mentioned other elements, e.g. the memory 130, the user input module 140, the display module 150, and the communication module 160, through, for example, the bus 110, can decipher the received commands, and perform operations and/or data processing according to the deciphered commands.

The memory 130 can store commands received from the processor 120 and/or other elements, e.g. the user input module 140, the display module 150, and the communication module 160, and/or commands and/or data generated by the processor 120 and/or other elements. The memory 130 may include programming modules, such as a kernel 131, middleware 132, an Application Programming Interface (API) 133, and an application 134. Each of the programming modules described above may be configured by software, firmware, hardware, and/or combinations of two or more thereof.

The kernel 131 can control and/or manage system resources, e.g. the bus 110, the processor 120 or the memory 130, used for execution of operations and/or functions implemented in other programming modules, such as the middleware 132, the API 133, and/or the application 134. Further, the kernel 131 can provide an interface through which the middleware 132, the API 133, and/or the application 134 can access and then control and/or manage an individual element of the electronic apparatus 100.

The middleware 132 can perform a relay function which allows the API 133 and/or the application 134 to communicate with and exchange data with the kernel 131. Further, in relation to operation requests received from at least one of an application 134, the middleware 132 can perform load balancing in relation to the operation requests by, for example, giving a priority in using a system resource, e.g. the bus 110, the processor 120, and/or the memory 130, of the electronic apparatus 100 to at least one application from among the at least one of the application 134.

The API 133 is an interface through which the application 134 can control a function provided by the kernel 131 and/or the middleware 132, and may include, for example, at least one interface or function for file control, window control, image processing, and/or character control.

The user input module 140 can receive, for example, a command and/or data from a user, and transfer the received command and/or data to the processor 120 and/or the memory 130 through the bus 110. The display module 150 can display an image, a video, and/or data to a user.

The communication module 160 can establish a communication between the electronic apparatus 100 and another electronic devices 102 and 104 and/or a server 164. The communication module 160 can support short range communication protocols, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
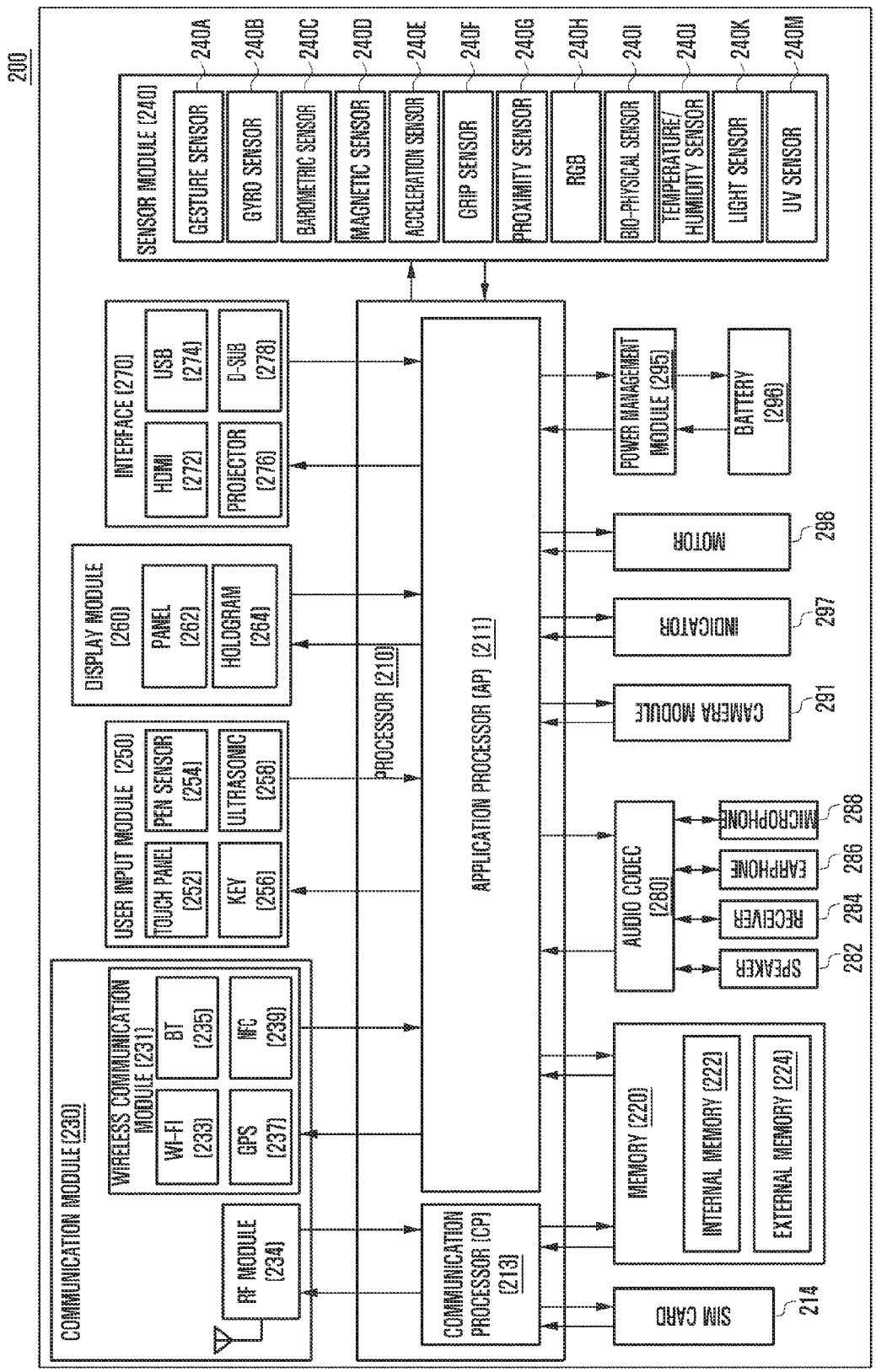
FIG. 2 is a block diagram illustrating hardware according to an embodiment of the present disclosure.

FIG. 2 is a block diagram illustrating hardware according to an embodiment of the present disclosure.

A hardware 200 may be, for example, the electronic apparatus 100 illustrated in FIG. 1.

Referring to FIG. 2, the hardware 200 may include at least one processor 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 may include at least one Application Processor (AP) 211 and/or at least one Communication Processor (CP) 213. The processor 210 may be, for example, similar to the processor 120 as illustrated in FIG. 1. Although FIG. 2 shows the AP 211 and the CP 213 included in the processor 210, the AP 211 and the CP 213 may be included in different Integrated Circuits (IC) packages, respectively. According to an embodiment, the AP 211 and the CP 213 may be included in a single IC package.

The AP 211 can execute an OS or an application program to control a plurality of hardware and/or software elements connected to the AP 211 and perform processing and calculation of various data including the multimedia data. The AP 211 may be implemented by, for example, a System on Chip (SoC). According to an embodiment, the processor 210 may further include a Graphic Processing Unit (GPU) (not illustrated).

The CP 213 can perform functions of managing a data link and/or converting a communication protocol in communication between an electronic apparatus, e.g. the electronic apparatus 100, including the hardware 200 and/or another electronic apparatus connected through a network to the electronic apparatus. The CP 213 may be implemented by, for example, an SoC. According to an embodiment, the CP 213 may perform at least a part of a multimedia control function. The CP 213 can perform identification and authentication of a terminal in a communication network by using, for example, a user identification module, e.g. the SIM card 214. Further, the CP 213 can provide services, such as a voice communication service, a video communication service, a short message service, and a packet data service, to a user.

Further, the CP 213 can control data transmission and/or reception of the communication module 230. Although the elements including the CP 213, the power management module 295, and the memory 220 are illustrated as being separate from the AP 211 in FIG. 2, the AP 211 may be implemented to include at least some, e.g. the CP 213, of the aforementioned elements according to an embodiment.

According to an embodiment, the AP 211 or the CP 213 may load a command and/or data received from at least one of a non-volatile memory and/or other elements connected thereto in a volatile memory and may then process the same. Further, the AP 211 or the CP 213 may store data received from and/or generated by at least one of the other elements in a non-volatile memory.

The SIM card 214 may be a card implementing a SIM and may be inserted in a slot formed at a particular position of an electronic apparatus. The SIM card 214 may include specific identification information, e.g. an Integrated Circuit Card IDentifier (ICCID), and/or subscriber information, e.g. an International Mobile Subscriber Identity (IMSI).

The memory 220 may include an internal memory 222 and/or an external memory 224. The memory 220 may be, for example, similar to the memory 130 as illustrated in FIG. 1. The internal memory 222 may include at least one of a volatile memory, e.g., a Dynamic Random Access Memory (DRAM), a Static RAM (SRAM), a Synchronous Dynamic RAM (SDRAM), or the like, and/or a non-volatile memory, e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like. According to an embodiment, the internal memory 222 may have a form of a Solid State Drive (SSD). The external memory 224 may further include a flash drive, for example, a Compact Flash (CF) drive, a Secure Digital (SD) drive, a Micro Secure Digital (Micro-SD) drive, a Mini Secure Digital (Mini-SD) drive, an extreme Digital (xD) drive, a memory stick, and/or the like.

The communication module 230 may include a wireless communication module 231 and/or a Radio Frequency (RF) module 234. The communication module 230 may be, for example, similar to the communication module 160 as illustrated in FIG. 1. The wireless communication module 231 may include, for example, a WiFi module 233, a BT module 235, a GPS receiving module 237, and/or a NFC module 239. For example, the wireless communication module 231 can provide a wireless communication function by using a wireless frequency. Additionally or alternatively, the wireless communication module 231 may include a network interface, e.g., a LAN card, and/or a modem for connecting the hardware 200 with a network, (e.g., Internet, a LAN, a WAN, a telecommunication network, a cellular network, a satellite network, a Plain Old Telephone Service (POTS), and/or the like. The NFC module 239 may include a connection node for connection to an NFC antenna.

The RF module 234 can perform data transmission/reception, for example, transmission and/or reception of an RF signal and/or a paged electronic signal. The RF module 234 may include, for example, a transceiver, a Power Amplifier Module (PAM), a frequency filter, a Low Noise Amplifier (LNA), and/or the like, which are not illustrated in FIG. 2. Further, the RF module 234 may further include a component for transmitting and/or receiving an electromagnetic wave in a free space in a wireless and/or wired communication, for example, a conductor, a conductive wire, and/or the like.

The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green, Blue (RGB) sensor 240H, a bio-physical sensor 240I, a temperature/humidity sensor 240J, an illuminance sensor 240K, and an Ultra Violet (UV) sensor 240M. The sensor module 240 can measure a physical property and/or detect an operation state of an electronic apparatus and convert the measured and/or detected information to an electric signal. Additionally/alternatively, the sensor module 240 may include, for example, an olfactory sensor, such as an E-nose sensor, (not illustrated), an Electro MyoGraphy (EMG) sensor (not illustrated), an Electro EncephaloGram (EEG) sensor (not illustrated), an Electro CardioGram (ECG) sensor (not illustrated), a fingerprint sensor, or the like. The sensor module 240 may further include a control circuit for controlling at least one sensor included in the sensor module 240.

The user input module 250 may include a touch panel 252, a pen sensor 254, which may be a digital pen sensor 254, a key 256, and an ultrasonic input device 258. The user input module 250 may be, for example, the user input module 140, as illustrated in FIG. 1. The touch panel 252 may detect a touch input in at least one scheme among, for example, a capacitive scheme, a resistive scheme, an infrared scheme, and an acoustic wave scheme. Further, the touch panel 252 may further include a controller (not illustrated). In the case of the capacitive scheme, the touch panel can recognize an indirect touch as well as a direct touch. A direct touch scheme may refer to a scheme in which a conductive object, e.g. a finger and/or a stylus pen makes a direct contact with a touch screen. According to an embodiment, an indirect touch scheme may refer to a scheme in which a conductive material wrapped by a non-conductive material, e.g. a finger wearing a glove, approaches a touch screen and/or the non-conductive material, e.g. a glove which a finger is wearing, contacts the touch screen. According to an embodiment, the indirect touch scheme may refer to a scheme in which a finger touches a non-conductive material, e.g. a cover for protecting a touch screen, in contact with an upper surface of the touch screen. According to an embodiment, the indirect touch scheme may refer to a scheme, usually called hovering, in which an event is generated as a finger approaches a touch screen within a predetermined distance without coming into contact with the touch screen. The touch panel 252 may further include a tactile layer (not illustrated). In this event, the touch panel 252 may provide a tactile response to a user. The touch panel 252 may be provided at a screen, i.e. a touch screen, of the display module 260. The touch panel 252 may be implemented as an add-on type in which the touch panel is located on the touch screen, and/or as an on-cell type and/or an in-cell type in which the touch panel is inserted in the display module 260.

The pen sensor 254 may be implemented, for example, in the same and/or similar method as that of receiving a user's touch input and/or by using a separate sheet for recognition. For example, a keypad and/or a touch key may be used as the key 256. The ultrasonic input device 258 is a device that can identify data by detecting a sound wave from a terminal to a microphone, e.g., a microphone 288, through a pen generating an ultrasonic wave signal, and can achieve wireless recognition. According to an embodiment, the hardware 200 can receive a user input from an external device, e.g., a network, a computer, and/or a server connected with the communication module 230, by using the communication module 230.

The display module 260 may include a panel 262 and/or a hologram 264. The display module 260 may be, for example, similar to the display module 150 as illustrated in FIG. 1. For example, the panel 262 may be a Liquid Crystal Display (LCD) and/or an Active Matrix-Organic Light Emitting Diode (AM-OLED). The panel 262 may be implemented to be, for example, flexible, transparent, and/or wearable. The panel 262 may be configured by the touch panel 252 and one module. The hologram 264 may show a three dimensional image in the air by using an interference of light. According to an embodiment, the display module 260 may further include a control circuit for controlling the panel 262 and/or the hologram 264.

The interface 270 may include, for example, a High-Definition Multimedia Interface (HDMI) 272, a Universal Serial Bus (USB) 274, a projector 276, and a D-subminiature (D-sub) 278. Additionally or alternatively, the interface 270 may include, for example, a SD drive, a Multi-Media Card (MMC), (not illustrated) and/or an Infrared Data Association (IrDA) interface (not illustrated).

The audio codec 280 can bilaterally convert a voice and an electrical signal to each other. The audio codec 280 may convert voice information input and/or output through, for example, a speaker 282, a receiver 284, an earphone 286, and/or the microphone 288.

The camera module 291 is a device capable of photographing a still image and a moving image, and may include at least one image sensor, e.g., a front lens and/or a rear lens, an Image Signal Processor (ISP) (not illustrated), and/or a flash LED (not illustrated) according to an embodiment.

The power management module 295 can manage power of the hardware 200. Although not illustrated, the power management module 295 may include, for example, a Power Management IC (PMIC), a charger IC, and/or a battery gauge.

The PMIC may be mounted in, for example, an IC and/or an SoC semiconductor. Charging methods may be classified into a wired charging method and a wireless charging method. The charger IC can charge a battery and can prevent introduction of over-voltage and/or over-current from a charger. According to an embodiment, the charger IC may include a charger IC for at least one of the wired charging method and the wireless charging method. A magnetic resonance scheme, a magnetic induction scheme, and/or an electromagnetic scheme can be exemplified as the wireless charging method, and an additional circuit for wireless charging, such as a coil loop circuit, a resonance circuit, a rectifier circuit, and the like may be added.

The battery gauge can measure, for example, a residual quantity of the battery 296, and a voltage, a current, and/or a temperature during the charging. The battery 296 can supply power by generating electricity, and may be, for example, a rechargeable battery.

The indicator 297 may display a specific state, for example, a booting state, a message state, and/or a charging state of the hardware 200 and/or a part of the hardware, e.g., the AP 211. The motor 298 can convert an electrical signal into a mechanical vibration.

Although not illustrated, the hardware 200 may include a processing unit, e.g., a GPU for supporting a mobile TV. The processing unit for supporting a mobile TV can process media data according to a standard of Digital Multimedia Broadcasting (DMB), Digital Video Broadcasting (DVB), media flow, or the like. Each of elements of the hardware according to the present disclosure may be configured by one or more components, which may have different names according to the type of the electronic apparatus. The hardware according to the present disclosure may include at least one of the aforementioned elements and/or may further include other additional elements, and/or some of the aforementioned elements may be omitted. Further, some of the elements of the hardware according to the present disclosure may be combined into one entity, which can perform the same functions as those of the elements before the combination.

The term "module" used in the present disclosure may refer to, for example, a unit including at least one combination of hardware, software, and firmware. The "module" may be interchangeably used with a term, such as unit, logic, logical block, component, and/or circuit. The "module" may be a minimum unit of an integrally configured article and/or a part thereof. The "module" may be a minimum unit performing at least one function and/or a part thereof. The "module" may be mechanically and/or electronically implemented. For example, the "module" according to the present disclosure may include at least one of an Application-Specific ICt (ASIC) chip, a Field-Programmable Gate Arrays (FPGA), and a programmable-logic device for performing operations which has been known and/or are to be developed hereinafter.

Figure 3:
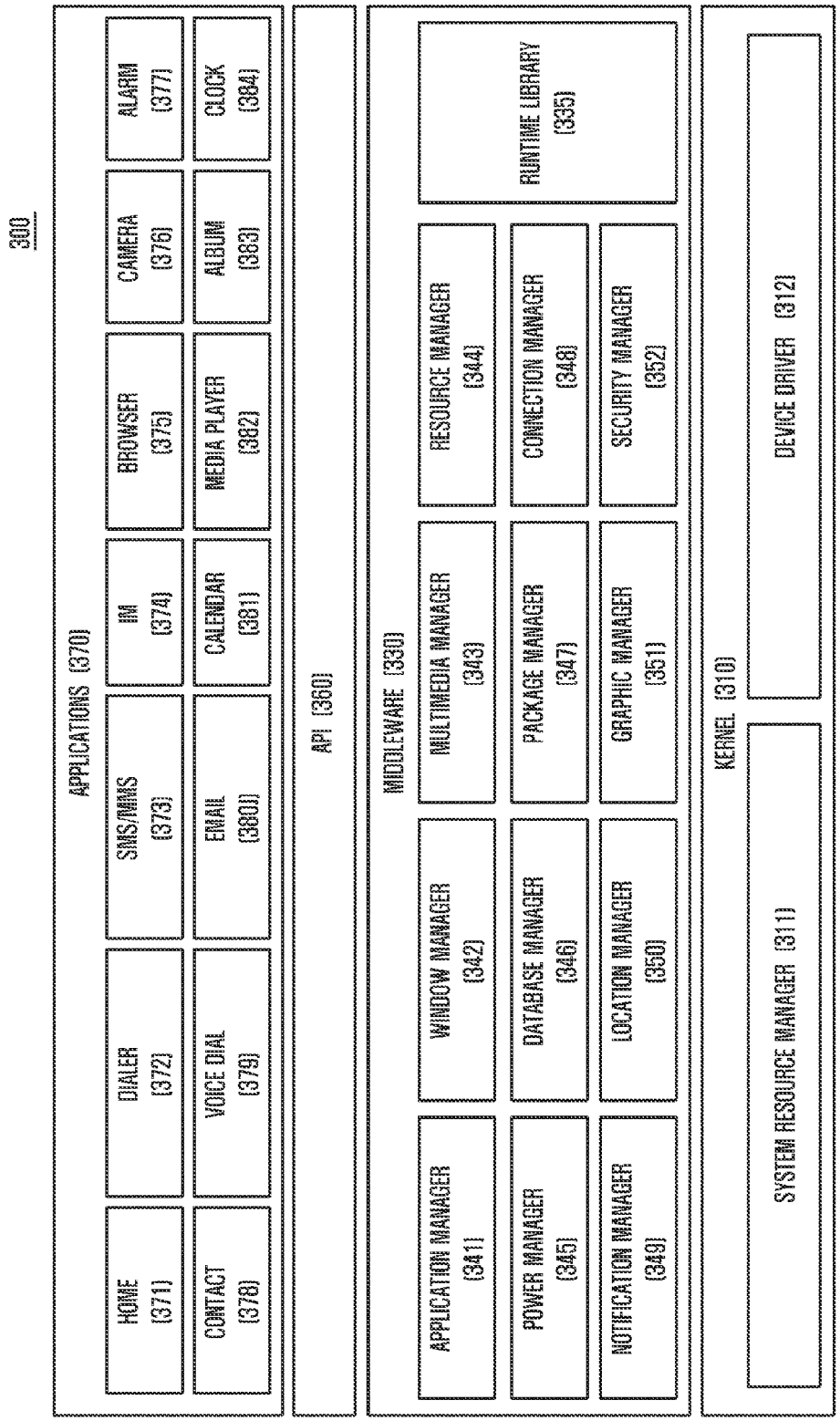
FIG. 3 is a block diagram illustrating a programming module according to an embodiment of the present disclosure.

FIG. 3 is a block diagram illustrating a programming module 300 according to an embodiment of the present disclosure.

Referring to FIG. 3, the programming module 300 may be included, e.g. stored, in the electronic apparatus 100, e.g. the memory 130, as illustrated in FIG. 1. At least a part of the programming module 300 may be configured by software, firmware, hardware, and/or combinations of two or more thereof. The programming module 300 may include an OS that is implemented in hardware, e.g., the hardware 200 to control resources related to an electronic device, e.g., the electronic device 100, and/or various applications. e.g., applications 370, driven on the OS. For example, the OS may be Android, iOS, Windows, Symbian, Tizen, Bada, or the like. Referring to FIG. 3, the programming module 300 may include a kernel 310, middleware 330, an API 360, and the applications 370.

The kernel 310, which may be like the kernel 131, may include a system resource manager 311 and/or a device driver 312. The system resource manager 311 may include, for example, a process manager, a memory manager, and a file system manager. The system resource manager 311 can control, allocate, and/or collect system resources. The device driver 312 may include, for example, a display driver, a camera driver, a Bluetooth driver, a shared memory driver, a USB driver, a keypad driver, a WiFi driver, and an audio driver. Further, according to an embodiment, the device driver 312 may include an Inter-Process Communication (IPC) driver (not illustrated).

The middleware 330 may include a plurality of modules implemented in advance for providing functions commonly used by the applications 370. Further, the middleware 330 can provide the functions through the API 360 such that the applications 370 can efficiently use restricted system resources within the electronic apparatus. For example, as shown in FIG. 3, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while one of the applications 370 is being executed. According to an embodiment, the runtime library 335 may perform an input/output, memory management, and/or a function for an arithmetic function.

The application manager 341 may manage a life cycle of at least one of the applications 370. The window manager 342 can manage Graphical User Interface (GUI) resources used by a screen. The multimedia manager 343 may detect formats used for reproduction of various media files, and may perform encoding and/or decoding of a media file by using a codec suitable for the corresponding format. The resource manager 344 can manage resources such as a source code, a memory, and a storage space of at least one of the applications 370.

The power manager 345 can manage a battery and/or power, while operating together with a Basic Input/Output System (BIOS), and can provide power information used for operation. The database manager 346 can manage generation, search, and/or change of a database to be used by at least one of the applications 370. The package manager 347 can manage installation and/or an update of an application distributed in a form of a package file.

For example, the connectivity manager 348 can manage wireless connectivity such as Wi-Fi or Bluetooth. The notification manager 349 can display and/or notify of an event, such as an arrival message, a promise, a proximity notification, and the like, in such a way that does not disturb a user. The location manager 350 can manage location information of an electronic apparatus. The graphic manager 351 can manage a graphic effect which will be provided to a user, and/or a user interface related to the graphic effect. The security manager 352 can provide all security functions used for system security and/or user authentication. According to an embodiment, when an electronic apparatus, e.g., the electronic apparatus 100, has a telephone call function, the middleware 330 may further include a telephony manager (not illustrated) for managing a voice and/or video communication function of the electronic apparatus.

The middleware 330 may generate and use a new middleware module through various functional combinations of the aforementioned internal element modules. The middleware 330 can provide modules specialized according to types of OSs in order to provide differentiated functions. Further, the middleware 330 may dynamically remove some of the existing elements and/or add new elements. Accordingly, the middleware 330 may exclude some of the elements described in the various embodiments of the present disclosure, further include other elements, and/or substitute the elements with elements having a different name and performing a similar function.

The API 360, which may be similar to the API 133, is a set of API programming functions, and may be provided with a different configuration according to the OS. For example, in a case of Android or iOS, one API set may be provided for each of platforms, and in a case of Tizen, two or more API sets may be provided.

The applications 370, which may include an application similar to the application 134, may include, for example, a preloaded application and/or a third party application. The applications 370 may include a home application 371 a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application.

At least a part of the programming module 300 can be implemented by commands stored in computer-readable storage media. When the commands are executed by at least one processor, e.g. the processor 210, at least one processor can perform functions corresponding to the commands. The computer-readable storage media may be, for example, the memory 204. At least a part of the programming module 300 can be implemented, e.g. executed, by, for example, the processor 210. At least a part of the programming module 300 may include, for example, a module, a program, a routine, a set of instructions and/or a process for performing at least one function.

The titles of the aforementioned elements of the programming module, e.g. the programming module 300, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4:
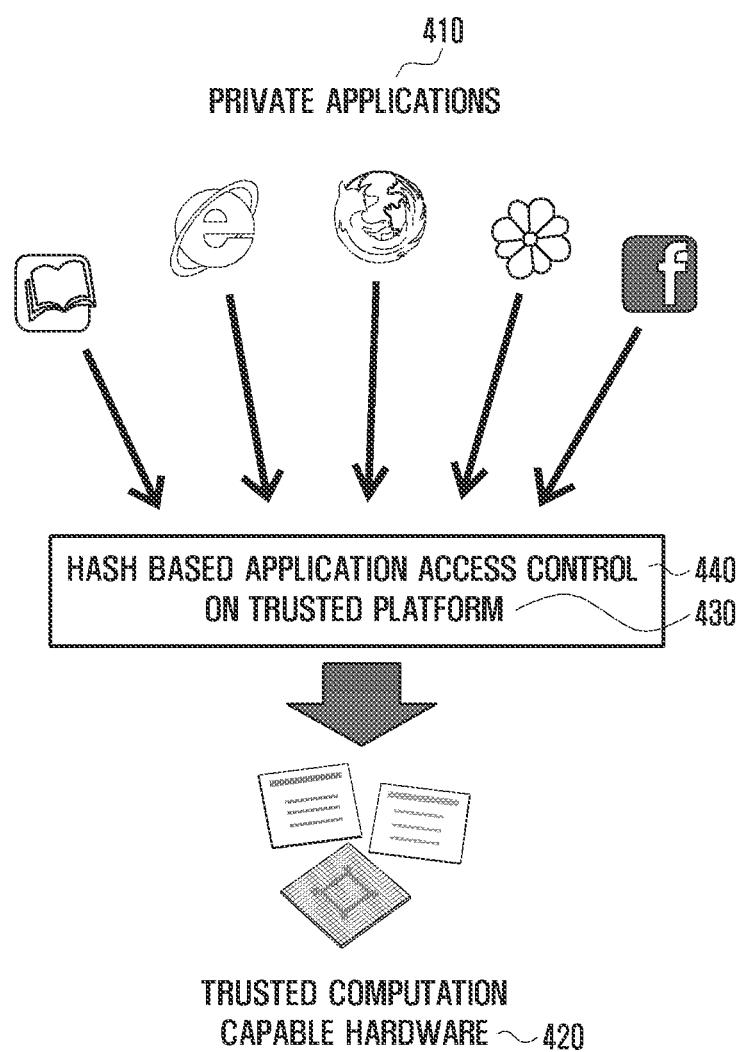
FIG. 4 illustrates deployment of products according to an embodiment of the present disclosure.

FIG. 4 illustrates deployment of products according to an embodiment of the present disclosure.

Referring to FIG. 4, some private applications 410 may request a trusted environment to allow access to a system resource and/or an application resource included in trusted computation capable hardware 420, e.g. a trusted storage, of the trusted environment. In this event, the application resource may refer to a key, e.g. a security key, sensitive data, access to somewhere, etc. The system resource may refer to a memory, a processor, a bus, etc. Hash based application access control 440 on a trusted platform 430 allows managing of separate access of these applications to their resources, while keeping confidentiality of each application. No user interaction, such as password input, is used while high hardware level security level is achieved.

Figure 5:
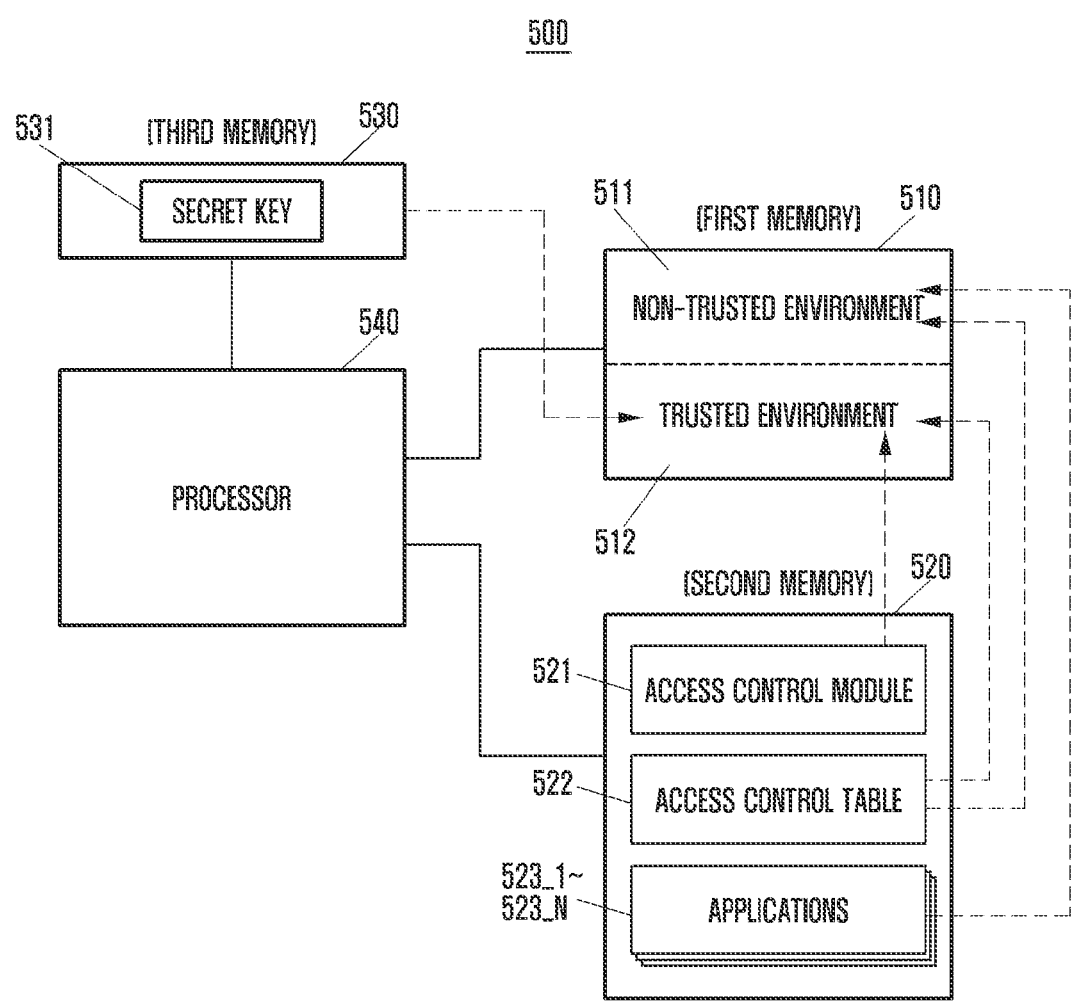
FIG. 5 is a block diagram illustrating hardware according to an embodiment of the present disclosure.

FIG. 5 is a block diagram illustrating hardware according to an embodiment of the present disclosure.

Referring to FIG. 5, Hardware 500 may be, for example, similar to the electronic apparatus 100 as illustrated in FIG. 1.

As shown in FIG. 5, the hardware 500 may include a first memory 510, a second memory 520, a third memory 530, and a processor 540.

The first memory 510 may be logically and/or physically configured into a non-trusted environment 511, such as a first area, and a trusted environment 512, such as a second area, by the processor 540. Further, the first memory 510 may be a volatile memory, e.g. a DRAM.

The second memory 520 may include an access control module 521, an access control table 522, and applications 523_1 to 523_N. Further, the second memory 520 may be a non-volatile memory (e.g. flash memory).

The third memory 530 may include a secret key 531. Further, the third memory 530 may be a non-volatile memory, e.g. a ROM. Although the third memory 530 is separate from the hardware 500 in FIG. 5, a part or the entire of the third memory 530 may be included in the hardware 500 according to an embodiment.

Figure 7:
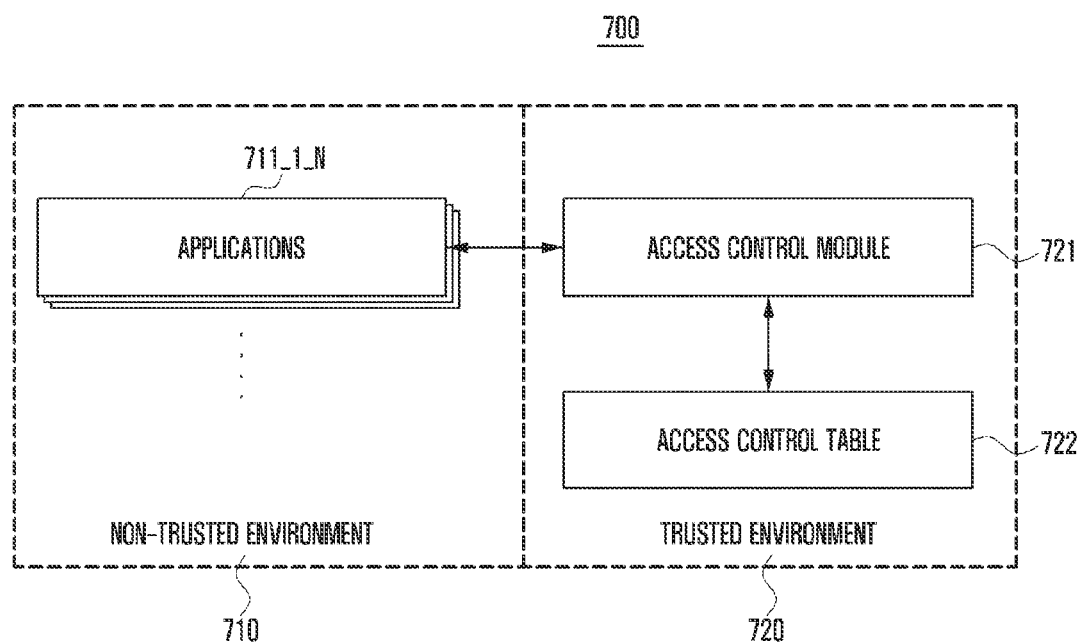
FIG. 7 is a block diagram illustrating a programming module according to an embodiment of the present disclosure.

The processor 540 may be, for example, the processor 211 illustrated in FIG. 2. When a battery power is supplied to the processor 540, a booting program is loaded from the second memory 520 and/or the third memory 530 to the first memory 510. The processor 540 can access the booting program loaded in the first memory 510, decipher its command, and perform a function, e.g. environment classification and/or OS loading, according to a result of the deciphering. The processor 540 can divide all or a part of the first memory 510 into the non-trusted environment 511 and the trusted environment 512, and can load an OS from the second memory 520 and/or the third memory 530 to the trusted environment 512 of the first memory 510. The processor 540 can access the booting program loaded to the first memory 510 and execute its function, e.g. access control module and its table loading. The processor 540 can load the access control module 521 and the secret key 531 into the trusted environment 512. According to an embodiment, the secret key 531 may not be loaded into the trusted environment 512. Further, the processor 540 can load the access control table 522, e.g. an access control table 612, into the non-trusted environment 511 and load at least one of the applications 523_1 to 523_N into the non-trusted environment 511. According to an embodiment, the access control table 522, e.g. an access control table 722 as illustrated in FIG. 7, may be loaded into the trusted environment 512. The processor 540 can access the access control module 521 and execute its function.

According to another embodiment, the electronic apparatus includes a volatile memory, e.g. the first memory 510, a non-volatile memory, e.g. the second memory 520, a hardware storage device, e.g. the third memory 530, and a processor, and the processor may be configured to perform various operations by software, such as, but not limited to, configuring the volatile memory into a first area, e.g. the non-trusted environment 511, and a second area, e.g. the trusted environment 512, temporarily storing first information, e.g. the secret key 531, extracted from the hardware storage device in the second area, temporarily storing second information, e.g. at least one of an additional file, a static content, an application code, a User Interface (UI) string, an animation instruction, application data, a contact, an image, a password, a text, a dynamic image, and contents, in the second area, recognizing a request for access of the software program temporarily stored in the first area to the second information, and authenticating the software program by using at least a part of the software program in the second area. The software program may comprise one or more of an application program, a system software component, or a service program. For the authentication, the processor may be configured to map at least a part of data of the software program to data having a fixed length. The processor may be configured to authenticate the software program by comparing a first hash value generated using at least a part of the software program and a second hash value that has been previously calculated. The processor may be configured to acquire the second hash value by using the first information. The processor may be configured to generate the first hash value by using a code and/or static data of the application. The processor may be configured to temporarily extract data including the second hash value from the non-volatile storage device into the second area. The processor may be configured to perform the authentication by using identification information of the software program. The processor may be configured to perform the authentication by using data obtained by encrypting at least a part of the software program stored together and an authentication tag obtained by encrypting a hash value of the data. For the authentication, the processor may be configured to allow access of the software program to the second information based on the authentication. The processor may be configured to configure the volatile memory into a first area and a second area, temporarily store first information extracted from the hardware storage device in the second area, acquire data representing an software program in the second area by using at least a part of the software program temporarily stored in the first area, encrypt the data representing the software program in the second area by using the first information, and store the encrypted data representing the software program in the non-volatile storage device. The processor may be configured to compare the data acquired using at least a part of the software program and a second hash value that has been previously calculated. The processor may be configured to encrypt and store identification information of the software program. The processor may be configured to store data obtained by encrypting at least a part of the software program together with an authentication tag obtained by encrypting a hash value of the data in the second area.

Figure 6:
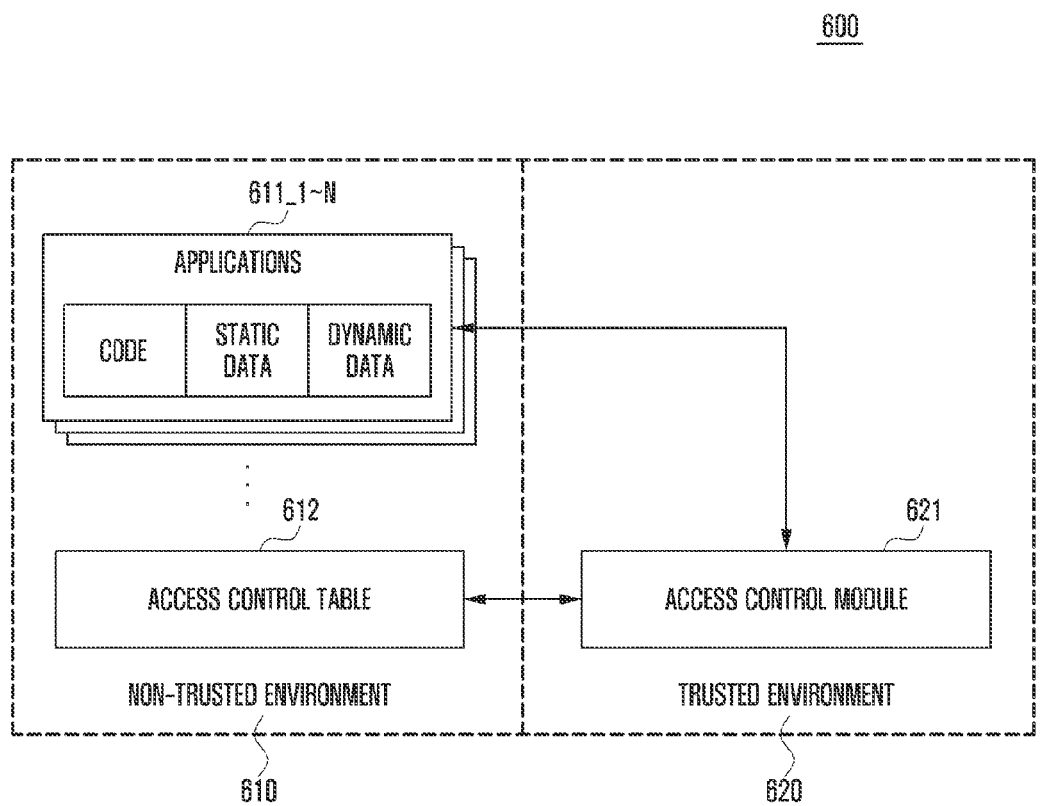
FIG. 6 is a block diagram illustrating a programming module according to an embodiment of the present disclosure.

FIG. 6 is a block diagram illustrating a programming module according to an embodiment of the present disclosure.

Referring to FIG. 6, a programming module 600 may be included, e.g. stored, in the electronic apparatus 100, e.g. the memory 130, illustrated in FIG. 1. At least a part of the programming module 600 may be configured by software, firmware, hardware, and/or combinations of two or more thereof.

The programming module 600 may include a non-trusted environment 610 and a trusted environment 620. The non-trusted environment 610 may include applications 611_1~N and an access control table 612. The trusted environment 620 may include an access control module 621. All functions of the access control module 621 can be executed in the trusted environment 620. The access control module 621 may be configured by software, firmware, hardware, and/or combinations of two or more thereof.

The applications 611_1~N may be, for example, elements of the applications 370 illustrated in FIG. 3. Each of the applications 611_1~N can request the access control module 621 to allow access to a resource. Each of the applications 611_1~N may include an application code, static data, and dynamic data. When the application is, for example, an address book application, like the contact application 378, the static data may be a background image and/or contacts and the dynamic data may be numbers included in each contact. The access control table 612 may include records corresponding to the applications 611_1~N. Such records may be encrypted.

In response to a request for registration from an application, e.g. the application 611_1, the access control module 621 can calculate a hash value and Identification (ID) information of the application. The access control module 621 can determine whether a record corresponding to the calculated hash value and ID information exists in the access control table 612. As a result of the determination, when a record corresponding to the calculated hash value and ID information does not exist, the access control module 621 can insert the calculated hash value and ID information as a new record in the access control table 612. This implies a successful registration of the corresponding application. In addition, the access control module 621 may generate and provide an application token to the corresponding application. When the hash value and ID information of the application already exists in the access control table 612, it implies that the application has been already registered and the access control module 621 may deny the request for the registration. Additionally, the access control module 621 may perform an operation of outputting a registration denial message to the user. In this event, the outputting may include at least one of a visual feedback using a display module, an auditory feedback using a speaker, and a tactile feedback using a motor.

An application, e.g. the application 611_1, can request the access control module 621 to allow access to some resources, such as access to a key, data, a certain place and/or another resource. In response to this request, the access control module 621 can calculate a hash value and ID of the application. The access control module 621 can calculate the hash value in various ways. For example, the access control module 621 may obtain a part or all of a binary path of the application from an OS, e.g. an OS of the trusted environment 620 and/or an OS of the non-trusted environment 610, and calculate a hash value of the obtained binary path. Otherwise, the access control module 621 may calculate a part or all of a code of an application existing in a memory, e.g. a secure storage managed by the trusted environment 620 and/or a usual storage managed by the non-trusted environment 610.

The access control module 621 may obtain a part or all of a binary path of an application from an OS and calculate an ID using the obtained binary path. Additionally or alternatively, the access control module 621 can calculate the ID using a title of the application stored in the memory. Otherwise, the access control module 621 may generate an ID by using various types of information, e.g. application title, OS title, version information, etc., of the application stored in the memory. Otherwise, the access control module 621 can configure at least one of various types of information of the application stored in the memory as an application ID.

When a record corresponding to the calculated hash value and ID information exists in the access control table 612, which implies that authentication of the application has succeeded, the access control module 621 can allow the access. As a result, the application can access the resource and perform operations, e.g. data reading, data writing, data change, use of hardware, access to another application, etc.

When a record corresponding to the calculated hash value and ID information does not exist, which implies that authentication of the application has failed, the access control module 621 can deny the access. Additionally, when the authentication has failed, the access control module 621 may perform an operation of outputting a warning message to the user. In this event, the outputting may include at least one of a visual feedback using a display module, an auditory feedback using a speaker, and a tactile feedback using a motor.

According to an embodiment, when the authentication has failed, the access control module 621 may generate and record and/or log an application upgrade event. The application upgrade can request approval of a user. When the application upgrade has been approved by the user, the access control module 621 can upgrade the corresponding application, calculate an ID and hash value of the upgraded application, and upgrade a corresponding record of the access control table 612 by the calculated ID and hash value. Thereafter, when the upgraded application requests access, the access control module 621 may allow the access.

The access control table 612 may be stored in the non-trusted environment 610. In this event, records of the access control table 612 may be encrypted according to an authenticated encryption scheme. For the encryption scheme, an Advanced Encryption Standard (AES)-Galois Counter Mode (GCM) process, e.g. a process shown in FIG. 8, may be used and/or another method, scheme, and/or operation may be used. Encryption of the records of the table can be executed in the trusted environment 620. For example, the access control module 621 can encrypt a record and register the encrypted record in the access control table 612. Decryption of an encrypted record can also be executed in the trusted environment 620. For example, the access control module 621 can read the access control table 612 from the non-trusted environment 610 and then decipher records of the read access control table by using a deciphering key, e.g. a secret trusted environment key. The access control module 621 can compare each of the deciphered records with the hash value and the ID of the application to determine whether a record corresponding to the hash value and the ID exists in the access control table.

The authenticated encryption process operating in the trusted environment 620 can guarantee the confidentiality of the access control table 612. Further, the authenticated encryption process can guarantee detection of any integrity violation in the access control table 612. This guarantee means that it is impossible, computationally, to forge any record in the access control table 612, and that any unauthorized change of the access control table 612 will be detected by the access control module 621. Ensuring of detection of integrity violation in the access control table 612 gives, in turn, a guarantee of correct access control decisions.

According to an embodiment, the application making a request for access to a resource to the access control module 621 may be an application operating in the trusted environment 620.

According to an embodiment, a resource requiring approval of access may be a resource included in the trusted environment 620. These resources may include at least one of system resources, e.g. a memory, a process, a bus, etc., and application resources, e.g. a key, data, another application, etc.

FIG. 7 is a block diagram illustrating a programming module according to an embodiment of the present disclosure.

Referring to FIG. 7, a programming module 700 may be included, e.g. stored, in the electronic apparatus 100, e.g. the memory 130, as illustrated in FIG. 1. The programming module 700 may include a non-trusted environment 710 and a trusted environment 720. The trusted environment 710 may include applications 711_1~N. The trusted environment 720 may include an access control module 721 and an access control table 722. When the access control table 722 is included in the safe trusted environment 720, records of the access control table 722 may not be encrypted.

Figure 8:
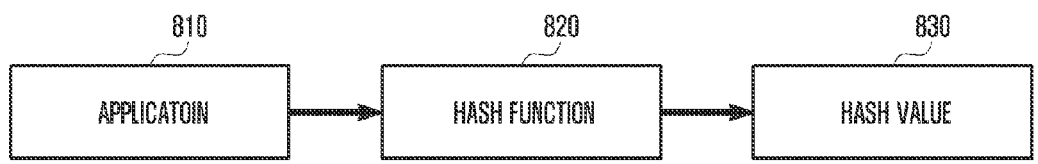
FIG. 8 is a view for describing an example of a hash value calculation process according to an embodiment of the present disclosure.

FIG. 8 is a view for describing an example of a hash value calculation process according to an embodiment of the present disclosure.

Referring to FIG. 8, an access control module, e.g. the access control module 621, can read all or a part of code and/or static data of an application 810. The access control module can calculate a hash value 830 of the read all or part of the application 810 by using an appointed hash function 820. For example, when the read all or part of the application 810 has a size of 1 GB and the hash function 820 is Secure Hash Algorithm (SHA)-256, the hash value 830 has a size of 256 bits.

FIGS. 9A, 9B, and 9C illustrate an access control tables according to an embodiment of the present disclosure.

Referring to FIG. 9A, in an access control table 910, each of records 910_1 to 910_N may include an encrypted Application_ID (App_ID) and an encrypted Application_Hash (App_Hash) value. The application ID may be configured from at least one of a full binary path and a title of a corresponding application. Of course, it may be configured in another way. The integrity of each record is ensured using an authenticated encryption process, and an integrity of the whole table may be also ensured.

According to an embodiment, a hash value in a record may be included in a trusted environment, e.g. the trusted environment 620 or 720, using the access control module 621, Media Access Control (MAC), etc. In a record, another value, e.g. an application ID, may be included in a non-trusted environment, e.g. the non-trusted environment 610 or 710. The access control table 910 may be included in the non-trusted environment, e.g. the non-trusted environment 610. Alternatively, the access control table 910 may be included in the trusted environment, e.g. the trusted environment 722.

Referring to FIG. 9B, in an access control table 920, each of records 920_1 to 920_N may include an encrypted App_Hash value, an encrypted Application-related resource, which may also be referred to as an Application_Asset (App_Asset), and authentication information $Auth_k$ for verifying whether a corresponding application has been forged. The authentication information $Auth_k$ may be generated using the corresponding application and/or information relating to the corresponding application. The access control table 920 may be included in the non-trusted environment, e.g. the non-trusted environment 610. Alternatively, the access control table 920 may be included in the trusted environment, e.g. the trusted environment 722.

Referring to FIG. 9C, in an access control table 930, each of records 930_1 to 930_N may include encrypted Application Authorization Information (App_Auth_Info), an encrypted App_ID, encrypted application data (Data), and an Authentication tag (Auth_Tagk). The access control table 930 may be included in the non-trusted environment, e.g. the non-trusted environment 610. Alternatively, the access control table 930 may be included in the trusted environment, e.g. the trusted environment 722.

Figure 10:
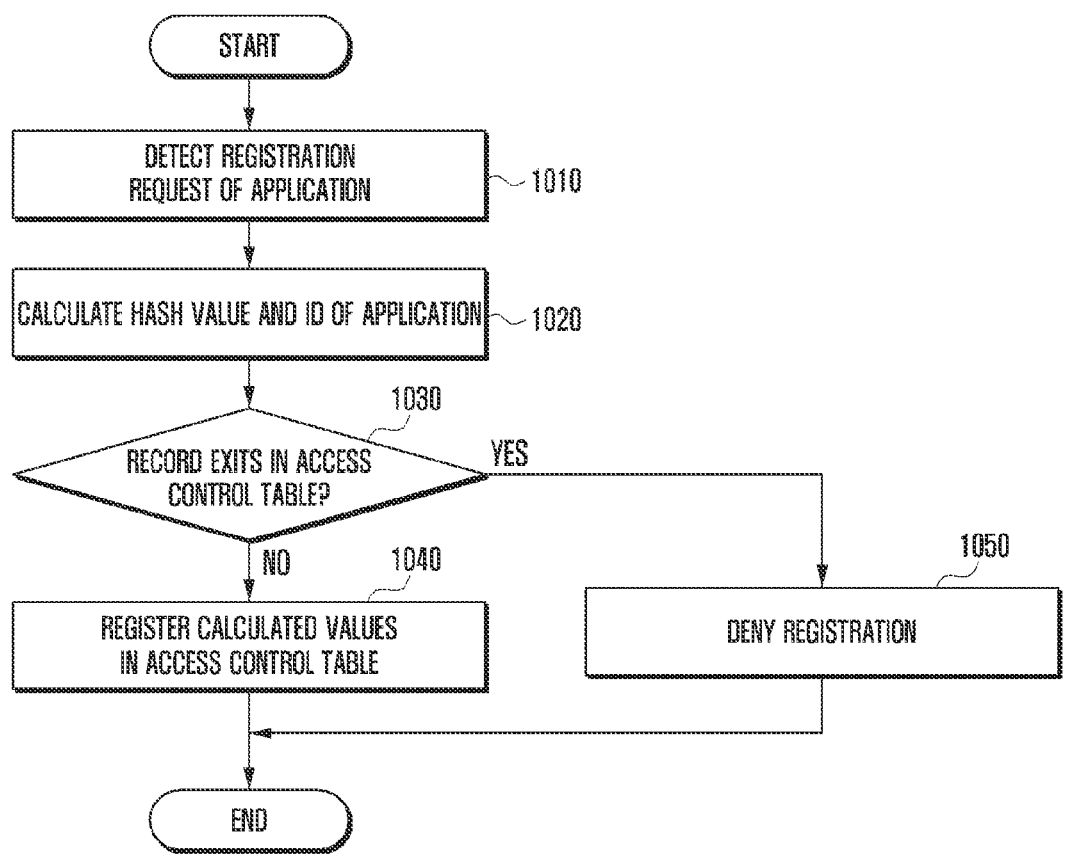
FIG. 10 is a flowchart for describing an application registration method according to an embodiment of the present disclosure.

FIG. 10 is a flowchart for describing an application registration method according to an embodiment of the present disclosure.

Referring to FIG. 10, in operation 1010, the processor 120 of the electronic apparatus 100 can detect a registration request of an application. In response to the registration request, the processor 120 can calculate a hash value and ID of the application in operation 1020. In operation 1030, the processor 120 can determine whether a record corresponding to the calculated values, (e.g. App1_ID and App1_hash, exists in the access control table. When the processor 120 determines, in operation 1030, that a corresponding record does not exist in the access control table, the processor 120 can register the calculated values in the access control table in operation 1040. When the processor 120 determines, in operation 1030, that a corresponding record exists in the access control table, the processor 120 can deny the registration request in operation 1050.

Figure 11:
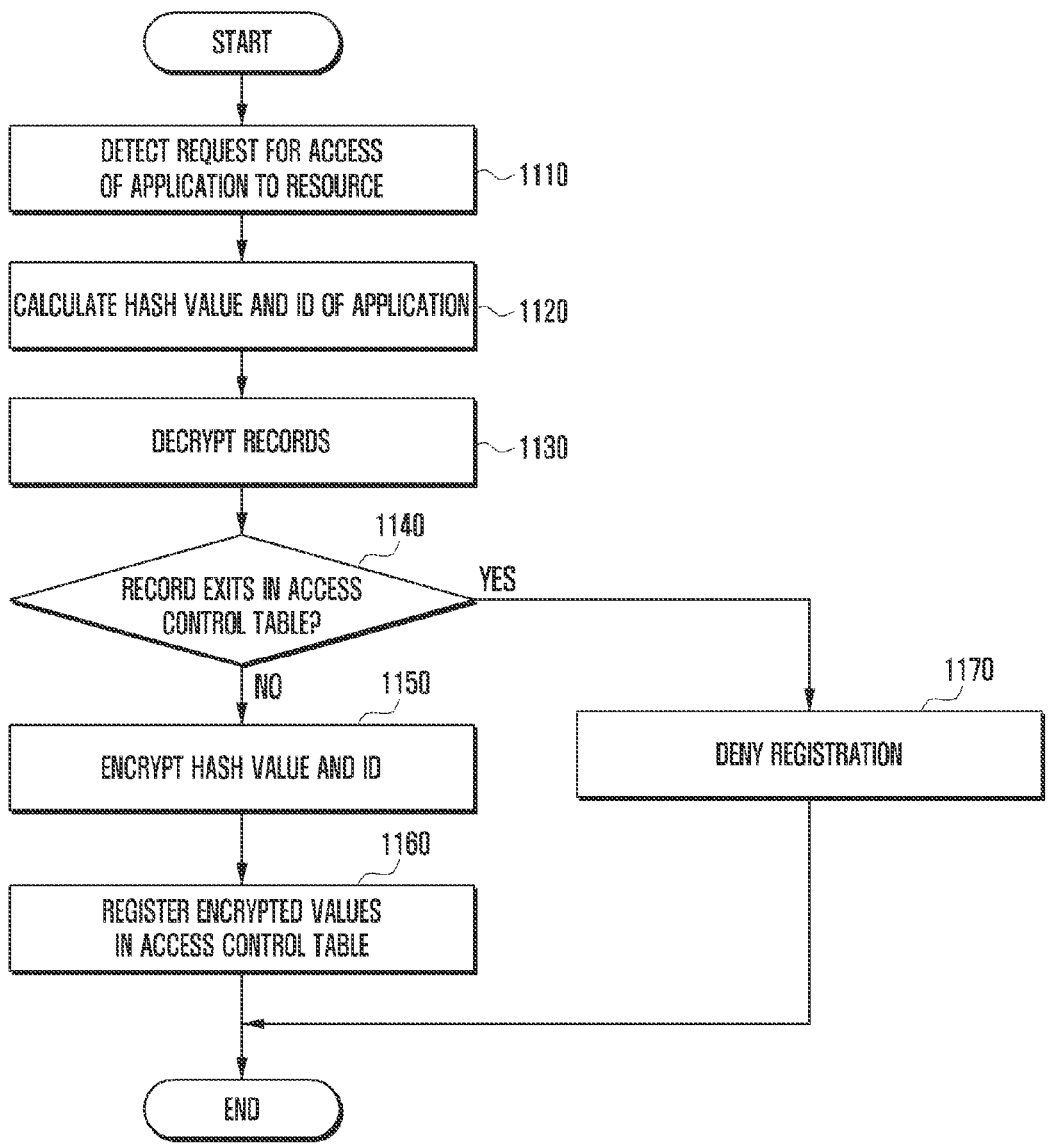
FIG. 11 is a flowchart for describing an application registration method according to an embodiment of the present disclosure.

FIG. 11 is a flowchart for describing an application registration method according to an embodiment of the present disclosure.

Referring to FIG. 11, in operation 1110, a processor 110 of an electronic apparatus (e.g. electronic apparatus 100) can detect a registration request of an application, which may be a request for access of an application to a resource. In response to the registration request, the processor 120 can calculate a hash value and ID of the application in operation 1120. In operation 1130, the processor 120 can decrypt records of an access control table. In operation 1140, the processor 120 can determine whether a record corresponding to the calculated values, e.g. App1_ID and App1_hash, exists in the access control table. When the processor 120 determines, in operation 1140, that a corresponding record does not exist in the access control table, the processor 120 can encrypt register the calculated values in operation 1150. In operation 1160, the processor 120 can encrypt the hash value and the ID of the application and can register the encrypted values as records for a corresponding application in the access control table. When the processor 120 determines, in operation 1140, that a corresponding record exists in the access control table, the processor 120 can deny the registration request in operation 1170.

Figure 12:
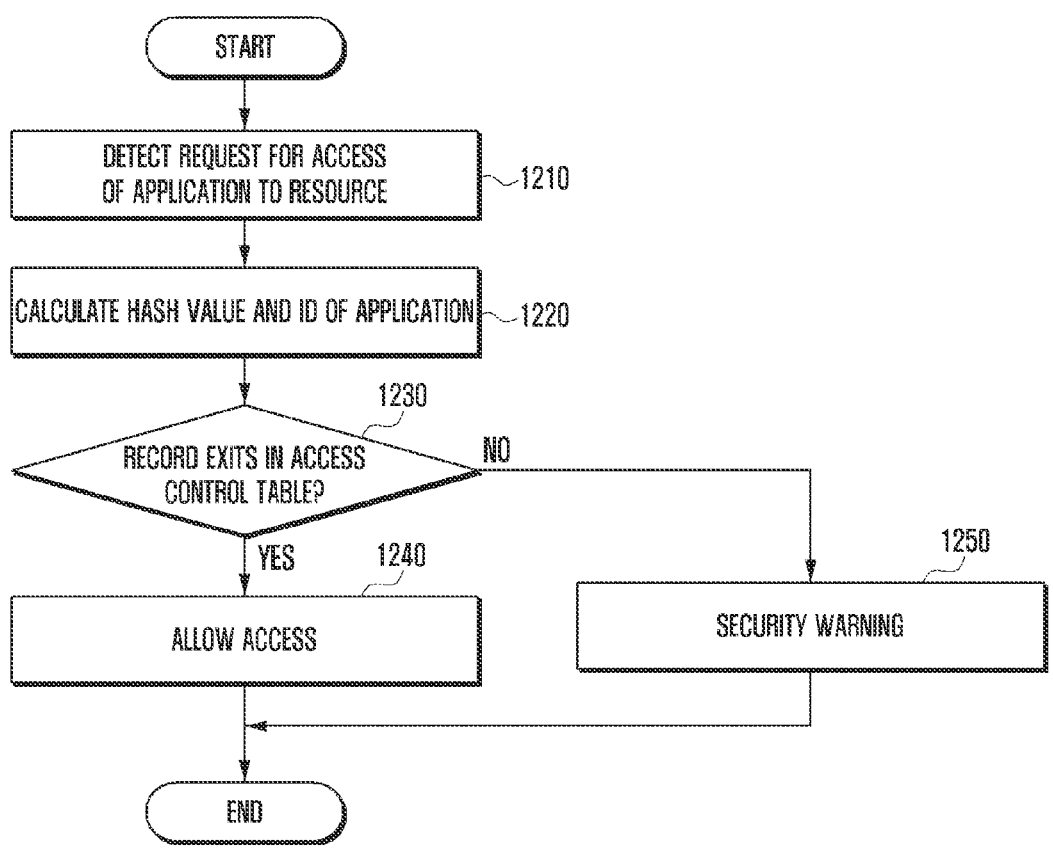
FIG. 12 is a flowchart for describing an application authentication method according to an embodiment of the present disclosure.

FIG. 12 is a flowchart for describing an application authentication method according to an embodiment of the present disclosure.

Referring to FIG. 12, in operation 1210, a processor 120 can detect a request for access of an application to a resource. In response to the request for access, the processor 120 can calculate a hash value and ID of the application in operation 1220. In operation 1230, the processor 120 can determine whether a record corresponding to the calculated values, e.g. App1_ID and App1_hash, exists in the access control table. When the processor 120 determines, in operation 1230, that a corresponding record exists in the access control table, the processor 120 can allow the access in operation 1240. When the processor 120 determines, in operation 1230, that a corresponding record does not exist in the access control table, the processor 120 can raise a security warning in operation 1250.

Figure 13:
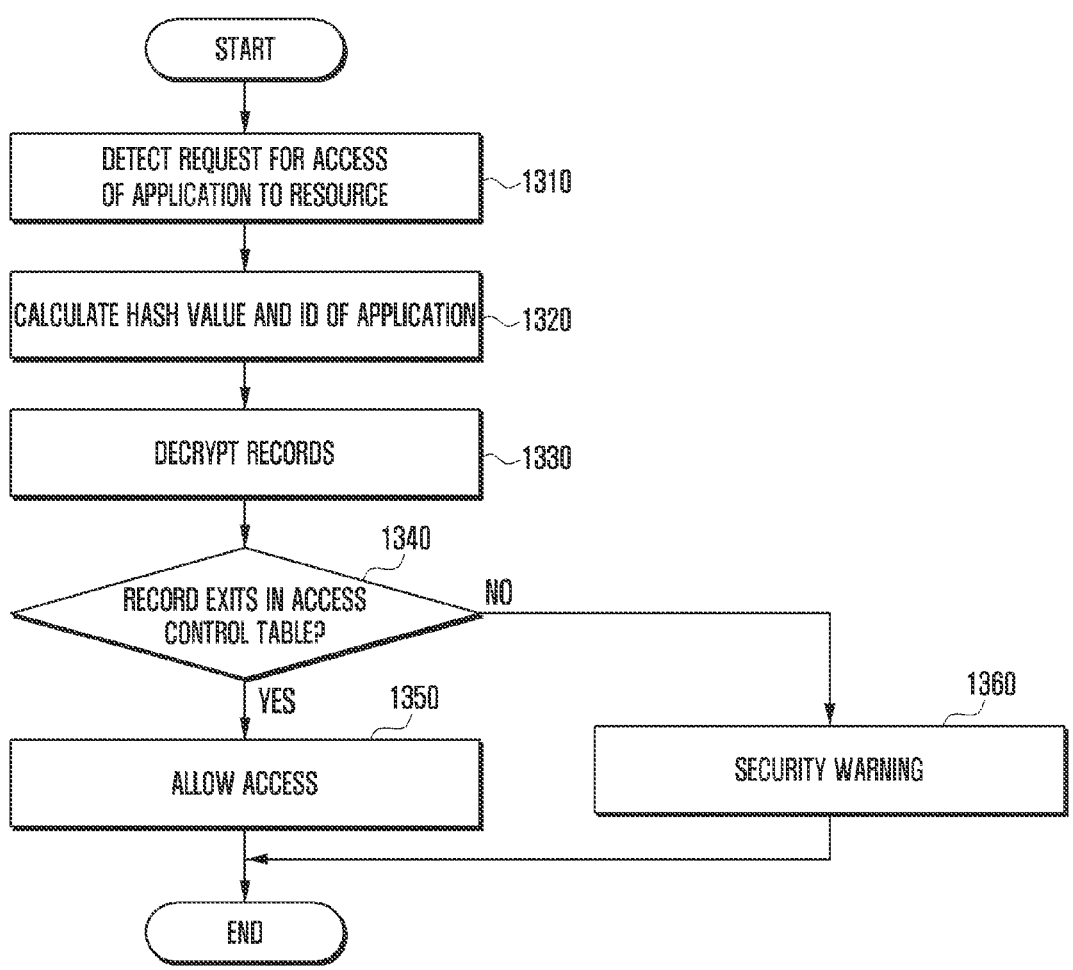
FIG. 13 is a flowchart for describing an application authentication method according to another embodiment of the present disclosure.

FIG. 13 is a flowchart for describing an application authentication method according to an embodiment of the present disclosure.

Referring to FIG. 13, in operation 1310, the processor 120 can detect a request for access of an application to a resource. In response to the request for access, the processor 120 can calculate a hash value and ID of the application in operation 1320. In operation 1330, the processor 120 can decrypt records of an access control table. In operation 1340, the processor 120 can determine whether a record corresponding to the calculated values, e.g. App1_ID and App1_hash, exists in the access control table. When the processor 120 determines, in operation 1340, that a corresponding record exists in the access control table, the processor 120 can allow the access in operation 1350. When the processor 120 determines, in operation 1340, that a corresponding record does not exist in the access control table, the processor 120 can raise a security warning in operation 1360.

Figure 14:
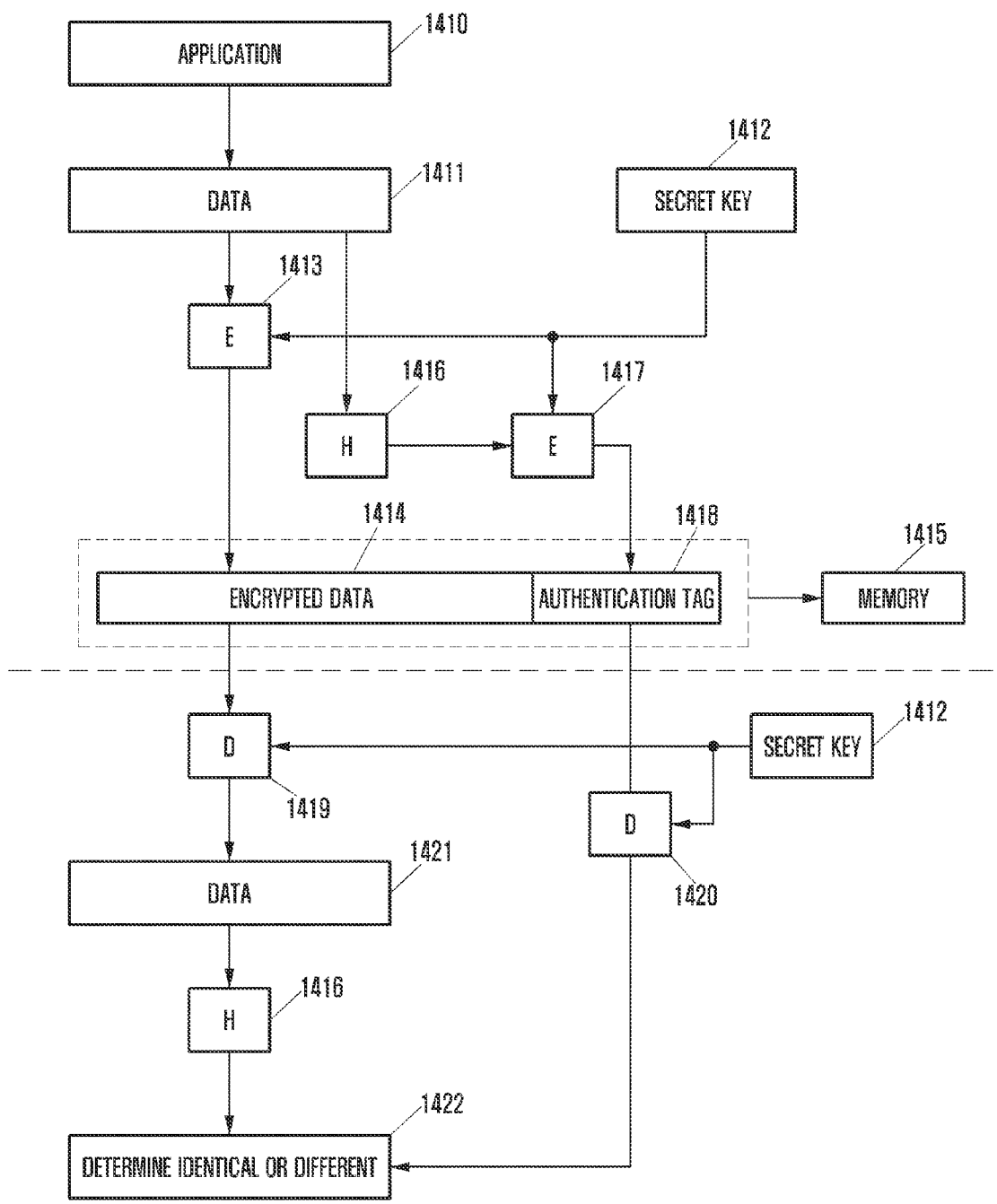
FIG. 14 is a view for describing an application registration and authentication method according to an embodiment of the present disclosure.

FIG. 14 is a view for describing an application registration and authentication method according to an embodiment of the present disclosure.

Referring to FIG. 14, an access control module, e.g. the access control module 521, can read all or a part of data 1411 of an application 1410. The access control module can encrypt the data 1411 by using a secret key 1412 in operation 1413 to generate encrypted data 1414. The access control module can store the encrypted data 1414 as a record of the application 1410 in a memory 1415.

The access control module can obtain a hash value of the data 1411 by using a hash function 1416 and then encrypt the hash value by using the secret key 1412 in operation 1417. The access control module can store the encrypted hash value as an authentication tag 1418 as a record of the application 1410 in the memory 1415.

The access control module can determine, by using the authentication tag 1418, whether the application has been forged. Specifically, the access control module can read the encrypted data 1414 from the memory 1415 and decrypt the encrypted data 1414 by using the secret key 1412 in operation 1419 in order to generate decrypted data 1421. Further, the access control module can read the authentication tag 1418 from the memory 1415 and decrypt the authentication tag 1418 by using the secret key 1412 in operation 1420. As well known in the art, encryption and decryption schemes include a symmetric key scheme and a non-symmetric key scheme. If the data 1411 and hash value have been encrypted according to a non-symmetric scheme, the encrypted data 1414 and authentication tag 1418 can be decrypted using a special decryption key other than the secret key 1412.

The access control module can calculate the hash value of the decrypted data 1421 by using the hash function 1416. The access control module can compare the calculated hash value and the decrypted authentication tag 1418 to determine whether they are the same in operation 1422. When they are the same, the access control module can recognize that the decrypted data 1421 is normal. When they are not the same, the access control module can recognize that the decrypted data 1421 has been forged.

According to another embodiment, a method of authentication using an electronic apparatus may include configuring a volatile memory into a first area, e.g. a non-trusted environment, and a second area, e.g. a trusted environment, by a processor of the electronic apparatus including the volatile memory, wherein the second area, e.g. the trusted environment, has a more enhanced security than that of the first area, temporarily storing first information, e.g. a secret key, extracted from hardware and/or firmware in the second area by the processor, temporarily storing second information, e.g. additional files, static contents, an application code, UI strings, animation instructions, application data, contacts, images, passwords, texts, dynamic images, and contents in the second area by the processor, detecting an access request to the second information from an software program temporarily stored in the first area by the processor, and authenticating the software program by using at least a part of the software program in the second area by the processor. The authenticating may include mapping at least a part of data of the software program to data having a fixed length. The authenticating may include authenticating the software program by comparing a first hash value generated using at least a part of the software program and a second hash value that has been previously calculated. The authenticating may include acquiring the second hash value by using the first information. The generating of the first hash value of the software program may include generating the first hash value by using a code and/or static data of the application. The authenticating may include temporarily extracting data including the second hash value from the non-volatile storage device into the second area. The authenticating may include performing the authentication by using identification information of the software program. The authenticating may include performing the authentication by using data obtained by encrypting at least a part of the software program and an authentication tag obtained by encrypting a hash value of the data. The method may further include allowing access of the software program to the second information based on the authenticating.

According to another embodiment, a method of registration by an electronic apparatus may include configuring a volatile memory into a first area, e.g. the non-trusted environment and a second area, e.g. the trusted environment, by a processor of the electronic apparatus including the volatile memory, wherein the second area has a more enhanced security than that of the first area, temporarily storing first information, e.g. the secret key, extracted from hardware and/or firmware in the second area by the processor, acquiring data representing an software program in the second area by using at least a part of the software program temporarily stored in the first area by the processor, encrypting the data representing the software program in the second area by using the first information, and storing the encrypted data representing the software program in a non-volatile storage device of the electronic apparatus. The acquiring of the data representing the software program may include mapping at least a part of data of the software program to data having a fixed length. The processor may further include comparing the data representing the software program acquired using at least a part of the software program and a second hash value that has been previously calculated. The comparing may include acquiring the second hash value by using the first information. The comparing may include temporarily extracting data including the second hash value from the non-volatile storage device into the second area. The acquiring of the data representing the software program may include generating the data representing the software program by using a code and/or static data of the application. The storing may include encrypting and storing identification information of the software program. The storing may include storing data obtained by encrypting at least a part of the software program together with an authentication tag obtained by encrypting a hash value of the data in the second area.

The method according to the disclosure as described above may be implemented as a program command which can be executed through various computers and recorded in a computer-readable recording medium. The recording medium may include a program command, a data file, and a data structure. Further, the program command may be specially designed and configured for the present disclosure or may be used after being known to those skilled in computer software fields. The recording medium may include magnetic media such as a hard disk, a floppy disk and a magnetic tape, optical media such as a Compact Disc Read-Only Memory (CD-ROM) and a DVD, magneto-optical media such as a floptical disk, and hardware such as a Read-Only Memory (ROM), a Random Access Memory (RAM) and a flash memory. Further, the program command may include a machine language code generated by a compiler and a high-level language code executable by a computer through an interpreter and the like.

While the present disclosure has been shown and described with reference to various embodiments therefore, it will be understood by those skilled in the art that various changes in form and details may be made therein without departing from the spirit and scope of the present disclosure as defined by the appended claims and their equivalents.

What is claimed is:

1. A method of access control in an electronic apparatus, the method comprising:
    detecting an access request to a resource from an application included in a first area of a memory by a processor of the electronic apparatus;
    in response to the access request, executing an access control module included in a second area of the memory to calculate a hash value of the application by the processor;
    determining whether a record exists in the memory, the record corresponding to the hash value and identification information of the application, by executing the access control module by the processor; and
    allowing access to the resource by the processor when the record exists in the memory, the record corresponding to the hash value and the identification information of the application,
    wherein the resource includes a system resource and an application resource, wherein the determining of whether the record exists in the memory comprises:
    decrypting the record encrypted and stored in the first area by using a key included in the second area; and
    determining whether the decrypted record corresponds to the hash value and the identification information,
    wherein the second area is an area requiring authentication of access by the processor.

2. The method of claim 1, wherein the memory is a volatile memory.

3. The method of claim 1, wherein allowing of the access to the resource comprises:
    decrypting another the record encrypted and stored in the first area by using a key included in the second area; and transferring the resource to the application, wherein the second area is an area requiring authentication of access by the processor.

4. The method of claim 1, further comprising:
encrypting the resource;
calculating a first hash value of the resource and encrypting the first hash value by a key; and
storing the encrypted resource and the encrypted first hash value,
wherein allowing of the access to the resource comprises:
decoding the encrypted resource by the key to calculate a second hash value;
decoding the encrypted first hash value by the key; and
allowing access to the resource when the second hash value is equal to the first hash value,
wherein the key is stored in an area of the memory requiring authentication of access by the processor.

5. The method of claim 1, wherein calculating of the hash value comprises calculating at least one hash value from among hash values of a binary path of the application, a code of the application, and static data of the application.

6. The method of claim 1, wherein the identification information comprises at least one of a binary path of the application and information stored in relation to the application.

7. The method of claim 1, further comprising outputting a warning message when the record corresponding to the hash value and the identification information of the application does not exist in the memory.

8. The method of claim 1, further comprising:
detecting a registration request from a second application by the processor;
in response to the registration request, calculating a second hash value of the second application;
determining whether a second record exists in the memory, the second record corresponding to the second hash value and second identification information of the second application; and
storing the second hash value and the second identification information of the second application when the second record does not exist in the memory.

9. An electronic apparatus comprising:
a first memory divided into a first area and a second area;
a second memory configured to store an access control table including a hash value and identification information of an application and a record for access control of the application to correspond to a resource; and
a processor configured to load the access control module into the first area and load the record in the first area,
wherein, using the access control module loaded into the first area, the processor is configured to perform:
in response to an access request from the application, calculating a hash value of the application by the processor;
determining whether a record exists in the first memory, the record corresponding to the hash value and identification information of the application; and
allowing access to the resource when the record exists in the first memory, wherein the resource includes a system resource and an application resource,
wherein the determining of whether the record exists in the first memory comprises:
decrypting another record encrypted and stored in the first area by using a key included in the second area; and
determining whether the decrypted record corresponds to the hash value and the identification information, and
wherein the second area is an area requiring authentication of access.

10. The electronic apparatus of claim 9, wherein at least one of the first memory and the second memory is a volatile memory.

11. The electronic apparatus of claim 9, wherein allowing of the access to the resource comprises:
decrypting another record encrypted and stored in the first area by using a key included in the second area; and
transferring the resource to the application,
wherein the second area is an area requiring authentication of access.

12. The electronic apparatus of claim 9, wherein the processor is configured to divide the first memory into the first area and the second area and loads a key for decoding stored in a third memory into the second area.

13. The electronic apparatus of claim 9, wherein the access control module is configured to perform:
encrypting the resource;
calculating a first hash value of the resource and encrypting the first hash value by a key; and
storing the encrypted resource and the encrypted first hash value, wherein allowing of the access to the resource comprises:
decoding the encrypted resource by the key to calculate a second hash value;
decoding the encrypted first hash value by the key; and
allowing access to the resource when the second hash value is equal to the first hash value,
wherein the key is stored in an area of the memory, the area requiring authentication of access by the processor.

14. The electronic apparatus of claim 9, wherein calculating of the hash value comprises:
calculating at least one hash value from among hash values of a binary path of the application, a code of the application, and static data of the application.

15. The electronic apparatus of claim 9, wherein the identification information comprises at least one of a binary path of the application and information stored in relation to the application.

16. The electronic apparatus of claim 9, wherein the access control module is configured to output a warning message when a record corresponding to the hash value and the identification information of the application does not exist in the memory.

17. The electronic apparatus of claim 9, wherein, using the access control module, the processor is configured to perform:
detecting a registration request from a second application;
in response to the registration request, calculating a second hash value of the second application;
determining whether a second record exists in the memory, the second record corresponding to the second hash value and identification information of the second application; and
storing the second hash value and the identification information of the second application when the second record does not exist in the memory.

* * * * *